N. P. HOLMQUIST.
ADJUSTABLE WAGON HOUND.
APPLICATION FILED JAN. 25, 1915.
1,171,201. Patented Feb. 8, 1916.
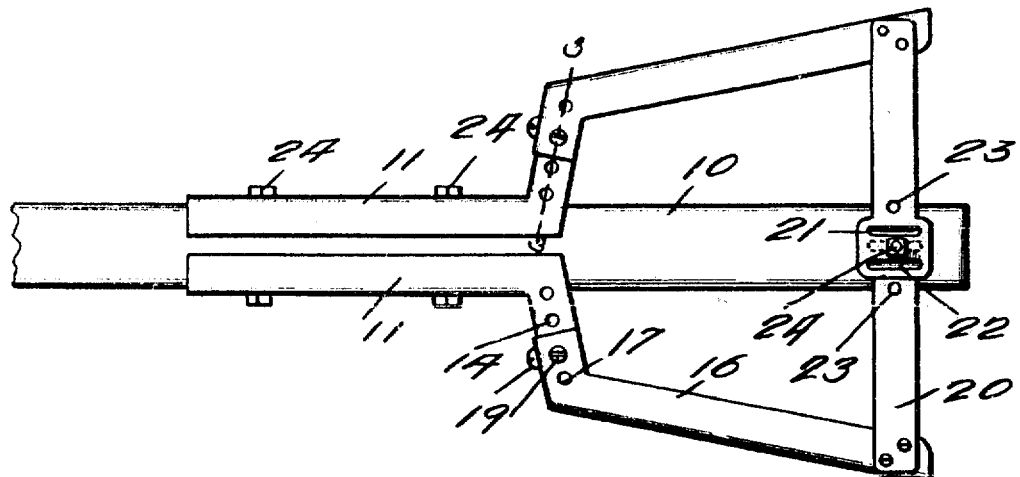
FIG. 1.
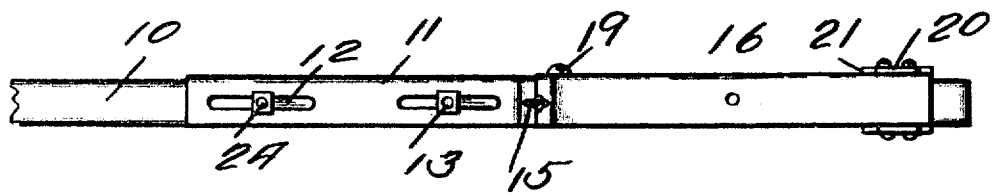
FIG. 2.
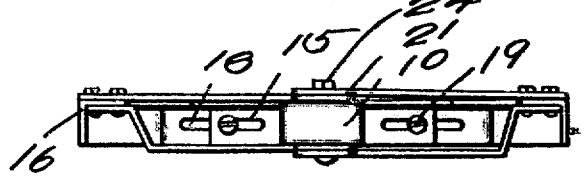
FIG. 4.
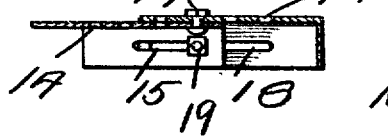
FIG. 3.
Inventor
N. P. Holmquist

UNITED STATES PATENT OFFICE.

NELS P. HOLMQUIST, OF FAIRMONT, MINNESOTA.

ADJUSTABLE WAGON-HOUND.

1,171,201.  Specification of Letters Patent.  Patented Feb. 8, 1916.

Application filed January 25, 1915. Serial No. 4,280.

*To all whom it may concern:*

Be it known that I, NELS P. HOLMQUIST, a citizen of the United States, residing at Fairmont, in the county of Martin, State of Minnesota, have invented certain new and useful Improvements in Adjustable Wagon-Hounds; and I do hereby declare the following to be a full, clear, and exact description of the invention, such as will enable others skilled in the art to which it appertains to make and use the same.

This invention relates to improvements in draft devices for wagons and particularly to hounds therefor.

The principal object of the invention is to provide a hound which can be adjusted to fit any size vehicle.

Another object is to provide a hound of simple and comparatively cheap structure which is adjustable on the tongue of the vehicle and which is itself adjustable to various widths.

Other objects and advantages will be apparent from the following description when taken in connection with the accompanying drawings.

In the drawings: Figure 1 is a plan view of my improved hound attached to the draft pole of a vehicle, Fig. 2 is a side elevation of the same, Fig. 3 is a transverse section on the line 3—3 of Fig. 1, and Fig. 4 is a rear elevation.

Referring particularly to the accompanying drawing, 10 represents the draft pole of a vehicle. A pair of angle plates 11 are disposed on opposite sides of the pole, one portion of each of the angle plates being formed with elongated slots 12 to receive bolts 13 which are passed through the pole transversely. One end of each of the angle plates 11 is directed outwardly away from the pole, and one part is formed with a series of openings 14, while the other part has an elongated slot 15. An angle strip 16 has its front end extending at the same angle as the end of the angle member 11 and one portion is formed with a plurality of openings 17 which register with the openings 14 while the other portion has an elongated slot 18 registering with the slot 15. Bolts 19 are passed through the registered openings and slots whereby the members 11 and 16 are capable of adjustment with respect to each other. The other end of the angle member 16 has a pair of inwardly directed arms 20, the inner ends of which are slightly enlarged as at 21 and engage respectively above and below the pole 10. Transversely of the enlarged portions 21 are elongated slots 22 while lines of openings 23 are formed longitudinal of said portions. Bolts 24 are passed through the enlargements and the pole so that the hounds can be adjusted longitudinally on the pole and the rear portions of the hounds adjusted transversely to different widths.

It will thus be seen that with a device of this character hounds can be manufactured and sold very cheaply as all of the parts are of the same size, the same being so connected that they are capable of adjustment to fit any sized wagon. It will also be noted that the hounds can be used for repair work, as for instance, where the ordinary hound brakes, one of these can be attached in place of the broken one or to support the broken part.

What is claimed is:

In a hound for vehicles, a pair of angle members mounted for longitudinal adjustment on a draft pole, a pair of angle members adjustably connected to the first named members and extending divergently from the ends thereof, upper and lower inwardly directed members carried by the second named members, the upper members having their inner ends arranged in overlapping relation on the upper surface of the draft pole, said lower members having their inner ends similarly arranged beneath said pole, said last named members being adjustable longitudinally and transversely of the pole, and means passable through the pole and common to the inner ends of said members to hold the inner ends in their adjusted positions.

In testimony whereof, I affix my signature, in the presence of two witnesses.

NELS P. HOLMQUIST.

Witnesses:
 G. F. ANDERSON,
 HARRY P. ELWARDS.

Copies of this patent may be obtained for five cents each, by addressing the "Commissioner of Patents, Washington, D. C."